United States Patent [19]

D'Aluisio

[11] Patent Number: 5,178,035
[45] Date of Patent: Jan. 12, 1993

[54] BICYCLE HEADSET

[75] Inventor: Christopher P. D'Aluisio, West Reading, Conn.

[73] Assignee: Cannondale Corporation, Georgetown, Conn.

[21] Appl. No.: 713,664

[22] Filed: Jun. 11, 1991

[51] Int. Cl.$^5$ ............................................. B62K 21/26
[52] U.S. Cl. ................................. 74/551.1; 280/280; 280/279; 384/477; 384/537
[58] Field of Search ................... 74/551, 551.1–551.3; 384/537, 541, 542, 609, 477; 280/276, 278, 280

[56] References Cited

U.S. PATENT DOCUMENTS

| | | | |
|---|---|---|---|
| 3,236,572 | 2/1966 | White, Sr. | 384/541 |
| 3,304,140 | 2/1967 | Hornigold | 384/537 |
| 4,274,301 | 6/1981 | Katayama | 74/551.1 |
| 4,323,263 | 4/1982 | Cook et al. | 74/551.1 |
| 4,653,768 | 3/1987 | Keys et al. | 74/551.1 |
| 4,934,839 | 6/1990 | Chi | 384/513 |

FOREIGN PATENT DOCUMENTS 0017687 of 1889 United Kingdom ............... 384/541

Primary Examiner—David A. Scherbel
Assistant Examiner—Winnie Yip
Attorney, Agent, or Firm—Lyon & Lyon

[57] ABSTRACT

A headset assembly attached to a bicycle for journaling a steering tube or a fork assembly within a head tube of the frame of the bicycle. The headset comprises upper and lower headset cups which are press fit within respective ends of the head tube. Each of the headset cups has a bore for receiving a respective cartridge bearing. Each of the headset cups has a rim with a radial slot and is designed such that the rim may clamp about a periphery of the respective cartridge bearings.

3 Claims, 2 Drawing Sheets

BICYCLE HEADSET

INTRODUCTION

The present invention relates to bicycles, and more particularly to a bearing arrangement for the headset of a bicycle.

BACKGROUND AND SUMMARY OF THE INVENTION

A bicycle comprises a frame, a front fork assembly and handlebars, and front and rear wheels. The front wheel is supported in the fork assembly and is steered by the handlebars which are connected to the fork assembly. The fork assembly has a steering tube at its upper end which is journaled in a suitable manner within a head tube of the bicycle frame. Bearing arrangements for supporting steering tubes for rotation to allow steering of bicycles are generally referred to as bicycle headsets. Various bicycle headset arrangements have been provided in the past and have not been entirely satisfactory because of the problems of bearing adjustment, bearing wear, and the like.

Accordingly, it is a principal object of the present invention to provide a new form of bicycle headset.

Another object of this invention is to provide an improved bearing support assembly for a bicycle headset.

These and other objects, advantages and features of the present invention will become better understood through consideration of the following description in conjunction with the drawings.

BRIEF DESCRIPTION OF THE DRAWINGS

FIG. 3b is a cross-sectional view along lines 3b—3b of FIG. 3a.

FIG. 4b is a cross-sectional view along lines 4b—4b of FIG. 4a.

DESCRIPTION OF THE PREFERRED EMBODIMENT

Figure 1:
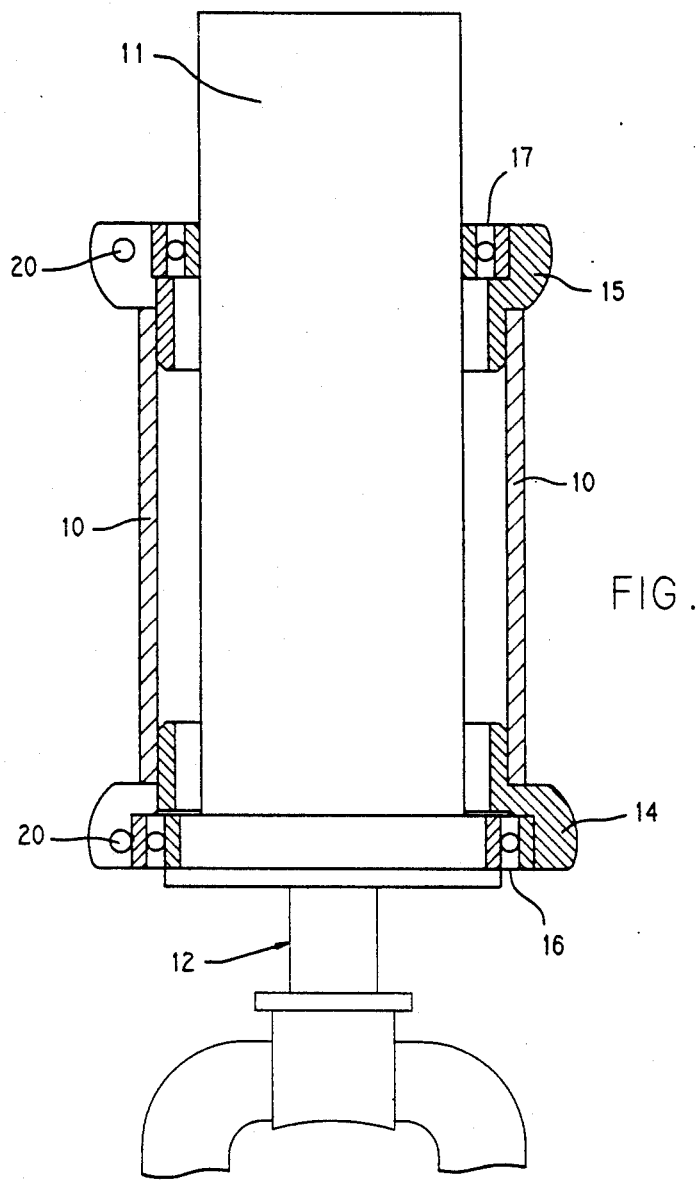
FIG. 1 is a diagrammatic illustration of a bicycle head tube, headset, and fork.

Turning now to the drawings, and first to FIG. 1, a head tube 10 of a bicycle frame is shown in cross-section having disposed therein a steering tube 11 of a fork assembly 12. A lower headset cup 14 and an upper headset cup 15 are secured in respective lower and upper ends of the head tube 10. A lower cartridge bearing 16 is secured at a lower end of the steering tube 11 of the fork 12 and disposed within the lower headset cup 14, and an upper cartridge bearing 17 is similarly secured toward an upper end of the steering tube 11 and disposed in the upper headset cup 15.

In assembly, the lower cartridge bearing 16 is press fit to the steering tube 11 and the steering tube 11 is inserted into the head tube 10 with the lower cartridge bearing 16 seated within a bore 32 in the lower headset cup 14. Then, the upper bearing 17 is press fit on the upper end of the steering tube 11 and similarly seated within the upper headset cup 15. As will appear subsequently in a discussion of FIGS. 2-4, both of the cups 14 and 15 have slots formed in their periphery edges and are tapped or threaded to receive respective screws 22 for clamping the cups 14 and 15 onto the outer periphery of the respective cartridge bearings 16 and 17.

Thus, the sealed cartridge bearing 16 is pressed on the steering tube 11 and the cups 14 and 15 are pressed into the head tube 10. The steering tube 11 is slid into the head tube 10 and the lower bearing 16 is seated in the lower cup 14. The upper bearing 17 is installed on tube 11 and seated in the upper cup 15.

The tolerances involved in pressing a bearing on both an inner diameter surface and an outer diameter surface make it very difficult to press a bearing on both its inner and outer diameter surfaces where two bearings are involved as in a head tube assembly 10 in a bicycle. With the arrangement as shown and described herein, only inner diameter surfaces of the bearings 16 and 17 are pressed onto the steering tube 11. The threaded holes 20 along with suitable screws 22 are used to clamp the respective cups 14 and 15 onto outer diameter surfaced of the respective bearings 16 and 17. With this arrangement, the amount of clamping force on the outer diameter surfaces of the bearings 16 and 17 can be easily varied to enable the bearings to run smoothly without requiring subsequent adjustment.

Figure 2:
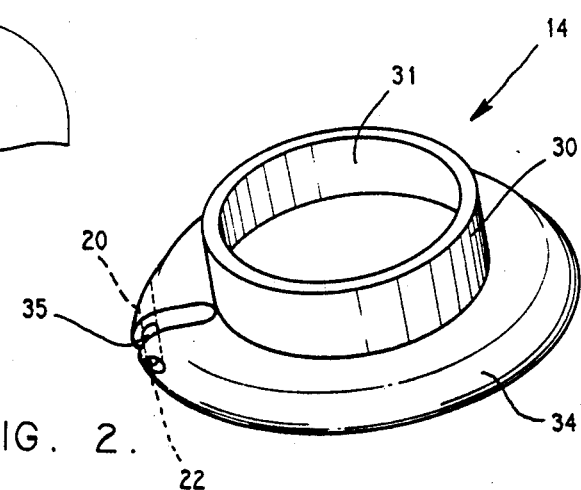
FIG. 2 is a simplified perspective view of a headset cup of the present invention.
Figure 3A:
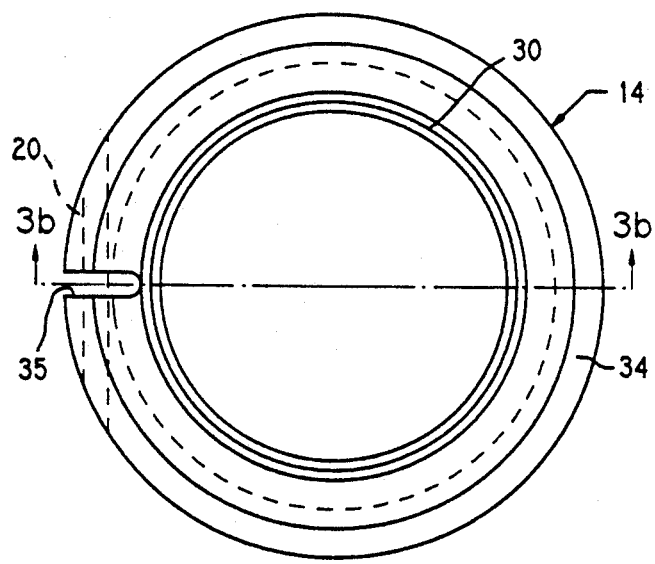
FIG. 3a is a top view of a lower headset cup.
Figure 3B:
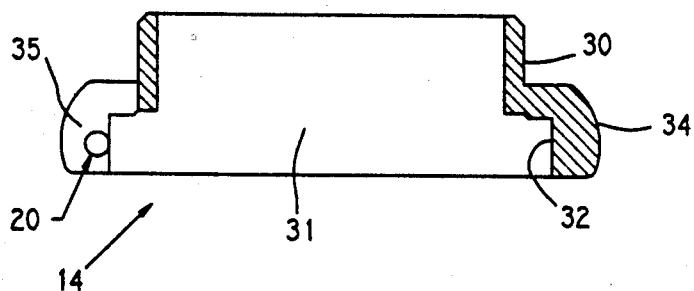

FIG. 2 is a simplified perspective view of the lower headset cup 14 and FIGS. 3a-3b are detailed top and cross-sectional view thereof respectively. The upper headset cup 15 is substantially identical to the lower cup 14 shown in FIG. 2 and is shown in FIG. 4. The cup 14 includes a skirt or sleeve 30 having an outer diameter to provide a secure press fit within the lower end of the head tube 10 and having an opening 31 through which the steering tube 11 can freely pass. The cup 14 has a bore 32 for receiving the cartridge bearing 16 and has an outer rim 34 with a radial slot 35 (note FIG. 3a). This slot 35 allows the outer rim 34 to be clamped onto the outer surface of the cartridge bearing 16 by tightening the screw 22 (note FIG. 2) into the threaded or tapped hole 20.

Figure 4A:
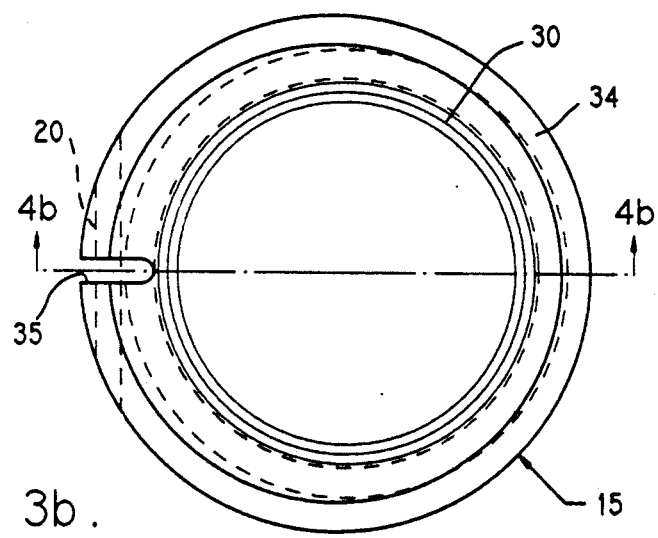
FIG. 4a is a top view of a upper headset cup.
Figure 4B:
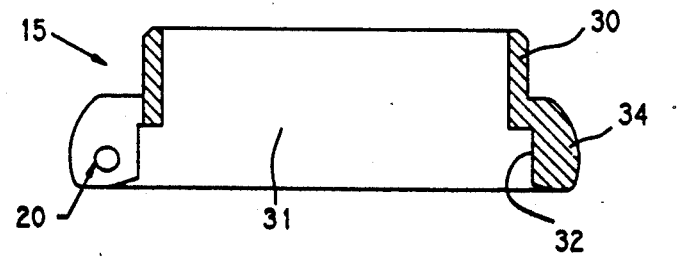

The upper cup 15 is substantially identical to the lower cut 14 and, thus, like reference numerals are used in FIGS. 4a-4b to identify like components thereof. The numbers 0.070 and 0.021 on FIG. 4a represent exemplary offsets of the center of the bore 32 for the bearing 16 and the outer diameter of the sleeve 30 to leave room for the threaded holes 20 and slot 35 on the side of the upper cup 15.

While an embodiment of the present invention has been shown and described, various modifications may be made without departing from the scope of the present invention, and all such modifications and equivalents are intended to be covered.

What is claimed is:

1. A bicycle headset for journaling a steering tube of a fork assembly in a head tube of a bicycle frame, said bicycle headset including at least one headset cup comprising a rim having a bore for receiving a bearing pressed on the steering tube, and having a skirt for fitting securely within an end of the head tube, and the rim having a radial slot therein to allow the rim to be clamped about an outer periphery of the bearing.

2. A bicycle headset for journaling a steering tube of a fork assembly in a head tube of a bicycle frame, said bicycle headset including first and second headset cups each comprising a rim having a bore for receiving a bearing pressed on opposite ends of the steering tube, and each having a skirt for fitting securely within opposite ends of the head tube, and the rims each having a radial slot therein to allow the rims to be clamped about an outer periphery of the bearings.

3. A bicycle headset in combination with a bicycle frame which includes a head tube having a fork assembly comprising a steering tube and the headset, said headset including first and second headset cups each comprising a rim having a bore with a bearing pressed on opposite ends of the steering tube, and each having a skirt fitting securely within opposite ends of the head tube, and the rims each having a radial slot therein to allow the rims to be clamped about an outer periphery of the bearings.

* * * * *